United States Patent
Wickman (10) Patent No.: US 6,939,089 B1
(45) Date of Patent: Sep. 6, 2005

(54) SURFORM FILE HOLDER WITH TENSIONING ADJUSTMENT

(76) Inventor: Anthony P. Wickman, 2021 Old Fort Dr., Tallahassee, FL (US) 32301

( * ) Notice: Subject to any disclaimer, the term of this patent is extended or adjusted under 35 U.S.C. 154(b) by 0 days.

(21) Appl. No.: 10/828,045

(22) Filed: Apr. 20, 2004

(51) Int. Cl.[7] ............................................... B23D 67/12
(52) U.S. Cl. ................................. 407/29.15; 407/29.11
(58) Field of Search ........................... 407/29.11, 29.1, 407/29.15, 29.14; 30/487, 492; 451/521–525, 451/354, 557, 356

(56) References Cited

U.S. PATENT DOCUMENTS

| | | | | |
|---|---|---|---|---|
| 2,143,063 A | * | 1/1939 | Fetterolf | ................... 407/29.11 |
| 2,255,395 A | | 9/1941 | Spink | |
| 2,666,978 A | | 1/1954 | Skillman | |
| 2,839,817 A | * | 6/1958 | Huxtable et al. | ......... 407/29.15 |
| 2,870,581 A | * | 1/1959 | Lyon | ........................... 451/356 |
| 3,214,823 A | | 11/1965 | Hendrickson | |
| 3,474,512 A | * | 10/1969 | Hansen | ........................ 29/76.1 |
| 3,583,107 A | | 6/1971 | Benis | |
| 3,874,126 A | * | 4/1975 | Catlin et al. | ................. 451/525 |
| 3,914,838 A | * | 10/1975 | Coon | ........................ 407/29.15 |
| 4,028,781 A | | 6/1977 | Konrad | |
| 4,263,704 A | * | 4/1981 | Myers et al. | ............. 407/29.15 |
| 4,423,571 A | | 1/1984 | Selander et al. | |
| 4,977,712 A | * | 12/1990 | Fisher et al. | ................. 451/510 |
| 5,669,808 A | * | 9/1997 | Simons | ....................... 451/524 |
| 5,971,840 A | | 10/1999 | Young | |

* cited by examiner

*Primary Examiner*—Daniel W. Howell
*Assistant Examiner*—Sara Addisu
(74) *Attorney, Agent, or Firm*—John Wiley Horton (57) ABSTRACT

A file holder configured to attach a prior art surform file to a prior art linear sander. The file holder includes conventional mounting means allowing it to be attached to the linear sander. A clip recess is provided on the file holder's first end. This feature is shaped to engage and hold the canted clip found on the first end of the surform file. A movable tensioning block is located on the second end of the file holder. It engages and holds the canted clip found on the second end of the surform file. Tensioning means are provided so that the user can adjust the tensioning block to place the surform file in tension. A chip cavity is located in the file holder adjacent the non-cutting side of the surform file. Ejection ports are provided in the side of the file holder. These allow chips collected in the chip cavity to escape the file holder.

12 Claims, 9 Drawing Sheets

SURFORM FILE HOLDER WITH TENSIONING ADJUSTMENT

BACKGROUND OF THE INVENTION

1. Field of the Invention

This invention relates to the field of tools. More specifically, the invention comprises a file holder which mounts a surform file on a reciprocating linear sander.

2. Description of the Related Art

Linear sanders have been used for many decades. U.S. Pat. No. 3,214,823 to Hendrickson (1965) shows one such device. A file is attached to the bottom of a power unit. The power unit drives the file in a linear fashion (forward and backward) so that the file teeth remove material. The power unit also includes handles and controls allowing a user to grip and activate the device. Although the '823 device is fluid powered, most modern linear sanders are either powered by air pressure or electricity.

Surform files have more recently gained widespread acceptance. These files feature a surface similar to a cheese grater (though the cutting teeth are typically much smaller). A number of cutting teeth are provided, with each tooth having an adjacent passage through the file. The chip removed by each cutting tooth passes through the passage to the back side of the file. Such files are said to include a cutting face (the side with the teeth) and a rear face. The ability to pass the chips through from the cutting face to the rear face prevents the cutting face from filling with chips and losing its effectiveness. Thus, for rough removal of material, surform files are quite effective.

A type of surform file is shown in U.S. Pat. No. 5,971,840 to Young (1999). The drawings in the '840 disclosure provide a good understanding of surform files. Those skilled in the art will know that they are thin and flexible.

Figure 1:
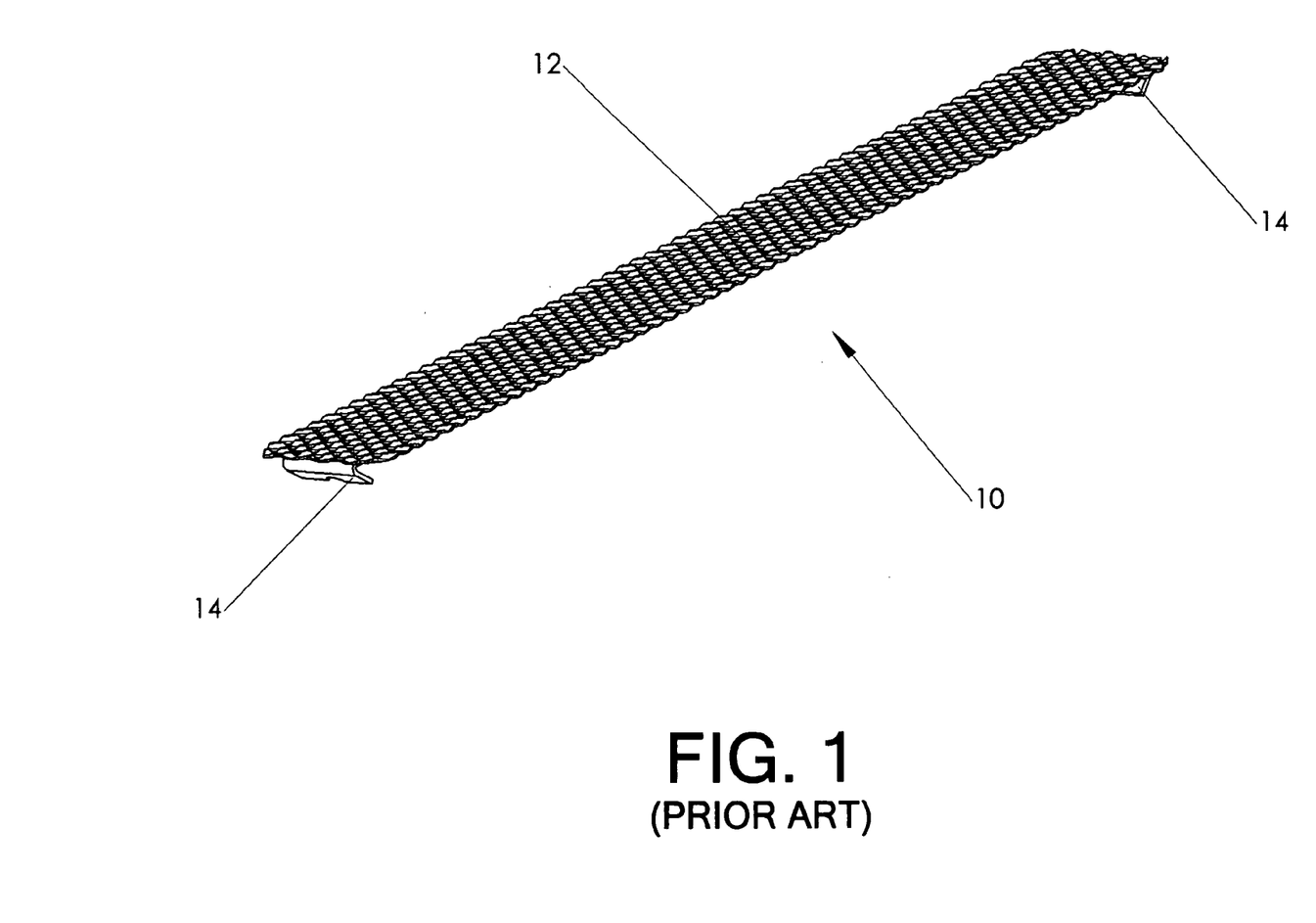
FIG. 1 is a perspective view, showing a prior art surform file.
Figure 2:
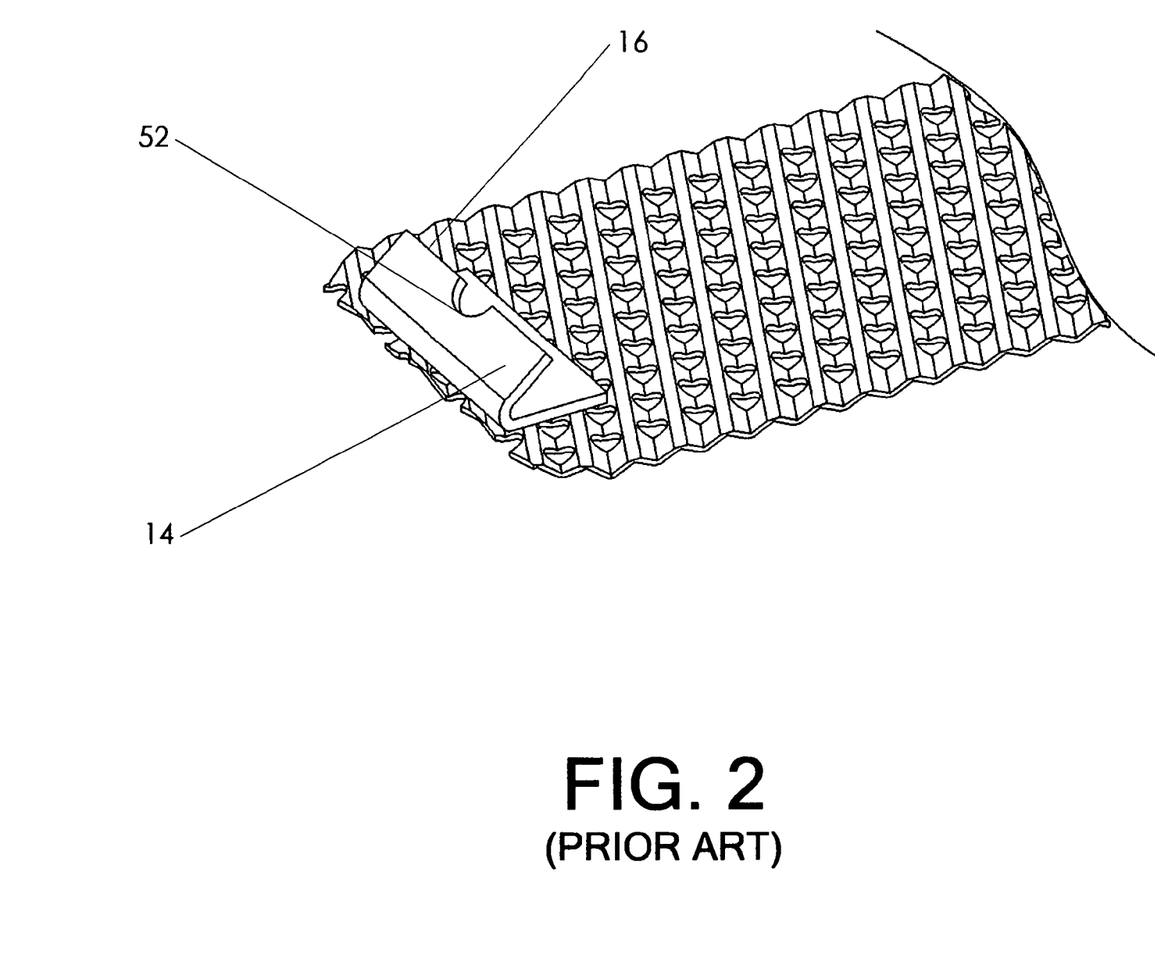
FIG. 2 is a detail view, showing an end bracket on a prior art surform file.

FIG. 1 shows a prior art surform file 10. The particular version shown has an arched shape. Flat files are also common, as are other shapes. Such files are not designed to be bolted in place (as is true for conventional files). Instead, they are attached using the two end brackets 14. FIG. 2 shows a detail view of one of the two end brackets 14. Each end bracket includes a canted clip 16. Each end bracket also includes a cutout 52 which is often used to attach the surform file to a handle for manual use.

BRIEF SUMMARY OF THE INVENTION

The present invention comprises a file holder configured to attach a prior art surform file to a prior art linear sander. The file holder includes conventional mounting means allowing it to be attached to the linear sander. A clip recess is provided on the file holder's first end. This feature is shaped to engage and hold the canted clip found on the first end of the surform file. A movable tensioning block is located on the second end of the file holder. It engages and holds the canted clip found on the second end of the surform file. Tensioning means are provided so that the user can adjust the tensioning block to place the surform file in tension.

A chip cavity is located in the file holder adjacent the non-cutting side of the surform file. Ejection ports are provided in the side of the file holder. These allow chips collected in the chip cavity to escape the file holder.

REFERENCE NUMERALS IN THE DRAWINGS

| | | | |
|---|---|---|---|
| 10 | surform file | 12 | cutting surface |
| 14 | end bracket | 16 | canted clip |
| 18 | linear sander | 20 | reciprocating shoe |
| 22 | mounting hole | 24 | file assembly |
| 26 | file holder | 28 | tensioning block |
| 30 | clip recess | 32 | chip cavity |
| 34 | ejection port | 36 | tensioning screw |
| 38 | washer | 40 | access slot |
| 42 | through hole | 44 | first end |
| 46 | second end | 48 | clip recess |
| 50 | bulkhead | 52 | cutout |
| 54 | mounting screw | | |

DETAILED DESCRIPTION OF THE INVENTION

Figure 3:
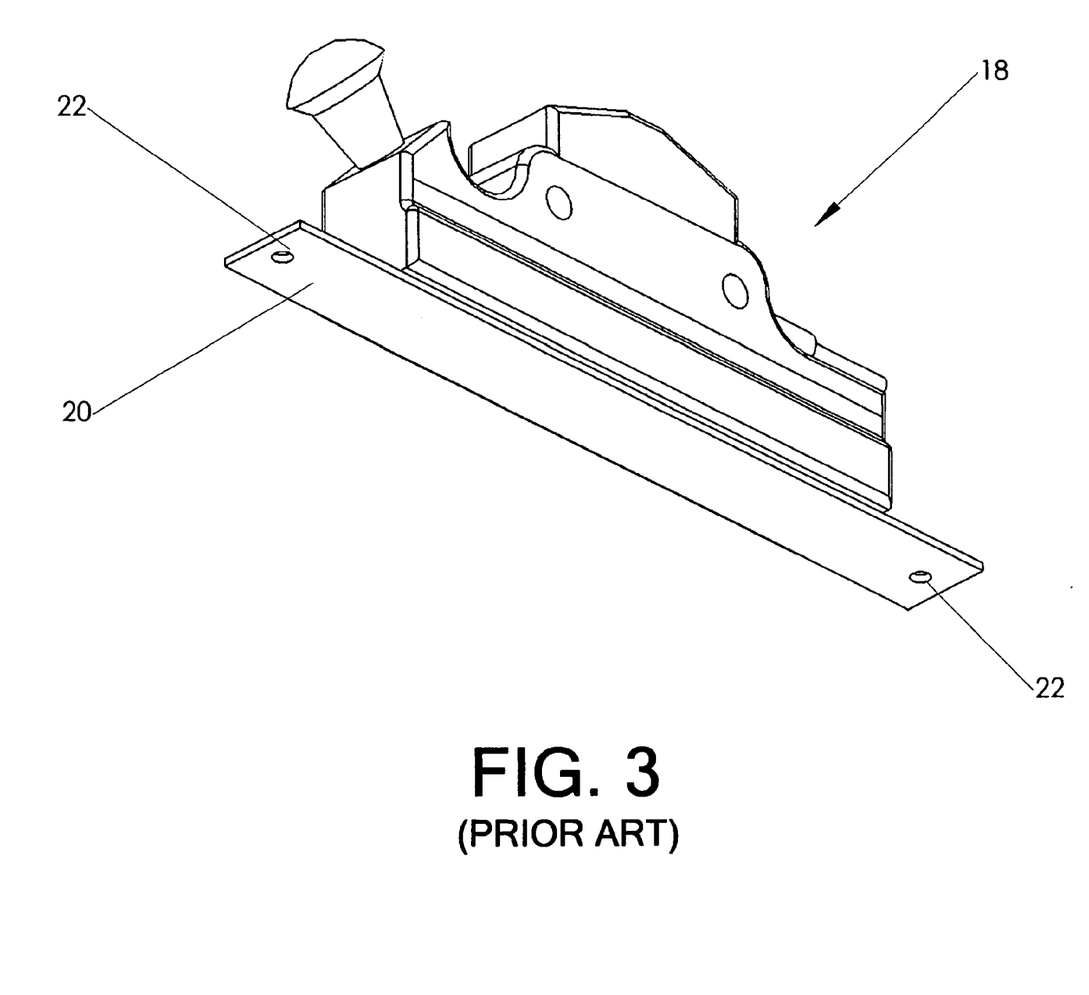
FIG. 3 is a perspective view, showing a prior art linear sander.

FIG. 3 shows a prior art linear sander 18. These typically feature a body containing the driving mechanism (whether electrical, hydraulic, or pneumatic). A reciprocating shoe 20 is located on the bottom of the sander. The driving mechanism drives reciprocating shoe 20 forward and backward. Two mounting holes 22 are provided in reciprocating shoe 20. These may be threaded, so that a threaded fastener can be used to attach a conventional file to reciprocating shoe 20. They may also simply be through holes, so that a nut must be used in combination with a threaded fastener.

Conventional flat files are mounted to reciprocating shoe 20. Such files have through holes for the threaded fasteners. The reciprocating shoe typically drives straight forward and straight backward (as opposed to a rotary or random action), so that the file teeth are correctly employed.

Figure 4:
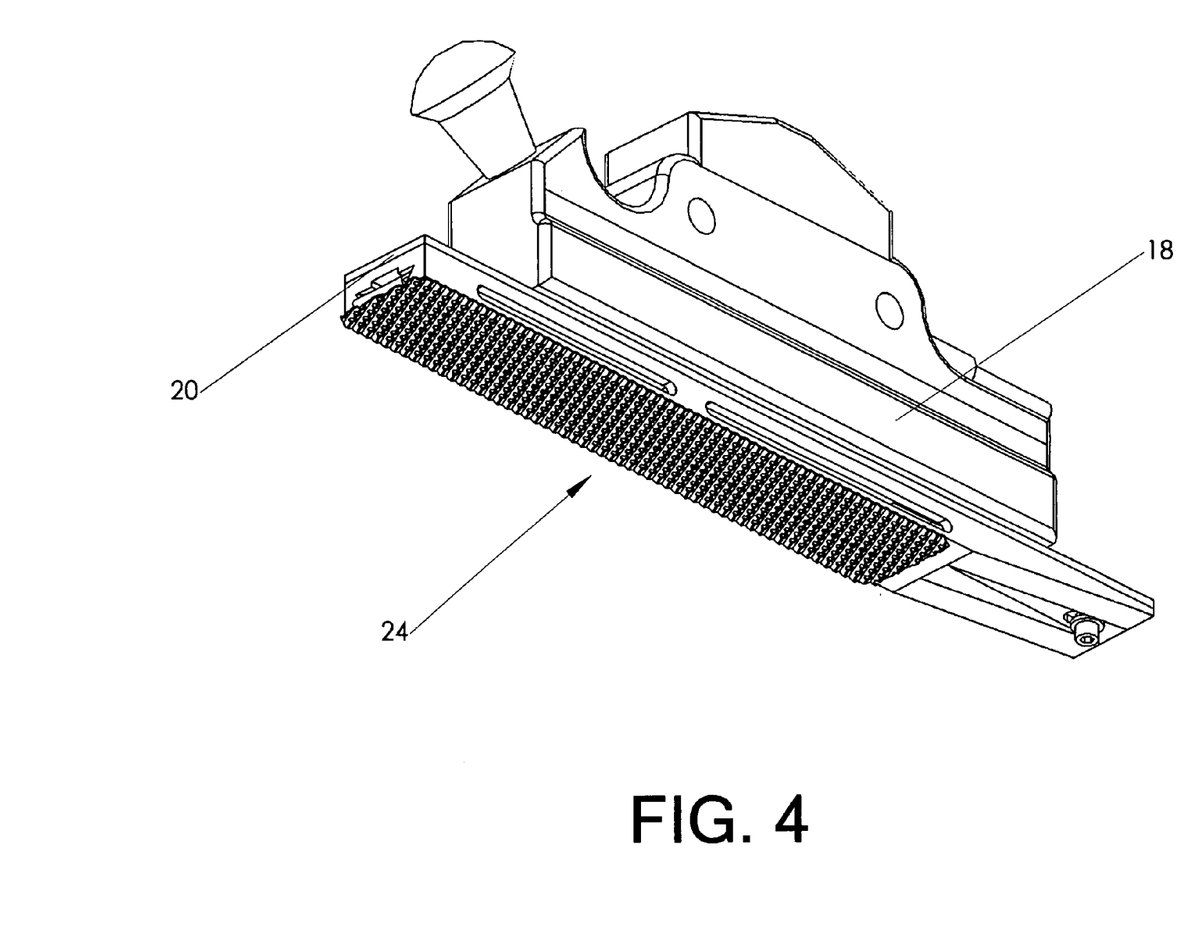
FIG. 4 is a perspective view, showing the present invention attached to a prior art linear sander.

The present invention adapts the newer surf from files for use with a conventional linear sander such as shown in FIG. 3. FIG. 4 shows the present invention assembled for use. File assembly 24, which includes the present invention with an attached surform file, is connected to reciprocating shoe 20. The linear sander is then used in the conventional fashion. The surform file, however, allows accelerated material removal.

Figure 5:
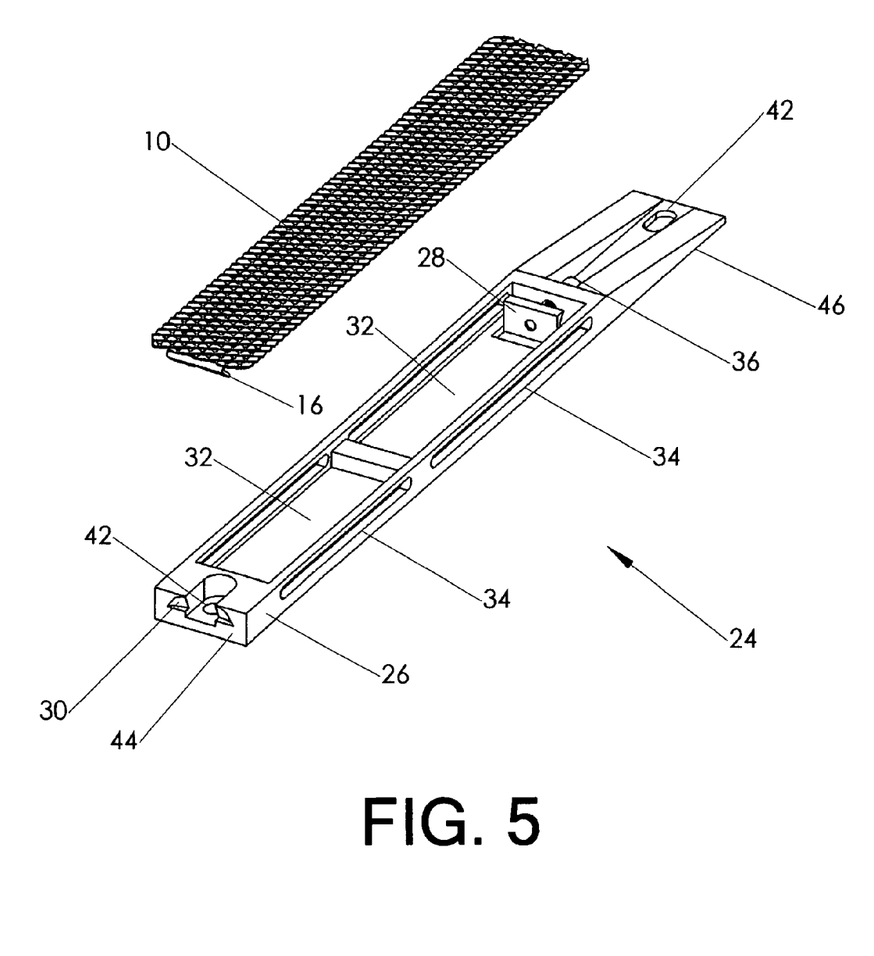
FIG. 5 is an exploded perspective view, showing the file holder.

FIG. 5 shows file assembly 24 in an exploded state. File holder 26 is an elongated bar, preferably made of a strong material such as metal or reinforced plastic. Two through holes 42 are provided. These align with the two mounting holes on the reciprocating shoe, so that fasteners can be used to attach file holder 26 to reciprocating shoe 20. Of course, the file holder will be inverted from the position shown in FIG. 5 when in use.

First end 44 of file holder 26 includes clip recess 30, which is shaped to engage and hold a canted clip 16 on surform file 10. Tensioning block 28 is located proximate second end 46. This tensioning block contains features shaped to engage and hold the other canted clip on the surform file.

Tensioning screw 36 is tightened to move tensioning block 28 further away from first end 44. With the two canted clips on the surform file engaged, tightening tensioning screw 36 will place surform file 10 in tension.

The cutting face of the surform file faces away from the file holder when it is installed. The rear face is directed toward the file holder. Chips cut by the surform file will be propelled through the file and away from the rear face. Chip cavity 32 is provided to receive these chips. A plurality of ejection ports 34 are provided in the sides of the file holder to allow chips accumulating within the chip cavity to escape. Thus, material removed by the surform file flows into the chip cavity and out of the file holder through the ejection ports.

Figure 6:
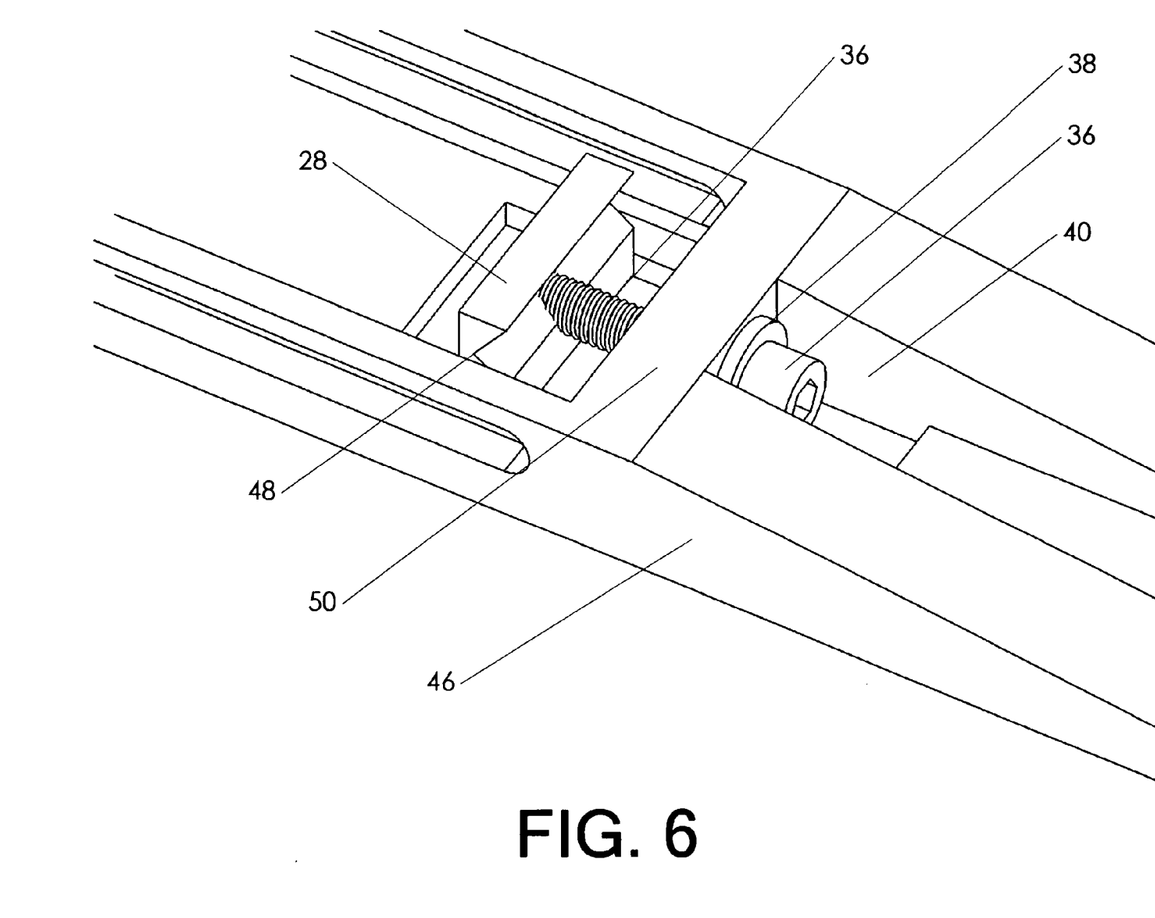
FIG. 6 is a detail view, showing the tensioning block.

FIG. 6 shows a detail view of second end 46. Tensioning screw 36 passes through a clearance hole through bulkhead 50. It is threaded into a threaded hole through tensioning block 28. A washer 38 is preferably provided. Access slot 40 is provided in the file holder to allow easy access to the head of tensioning screw 36. The reader will therefore appreciate that turning the tensioning screw in a clockwise direction will pull tensioning block 28 toward bulkhead 50 (assuming the use of a right-hand thread).

Tensioning block 28 includes a clip recess 48, which is shaped to engage a canted clip on the surform file. Thus, tightening the tensioning screw will place tension on the surform file and lock the surform file to the file holder.

Figure 7:
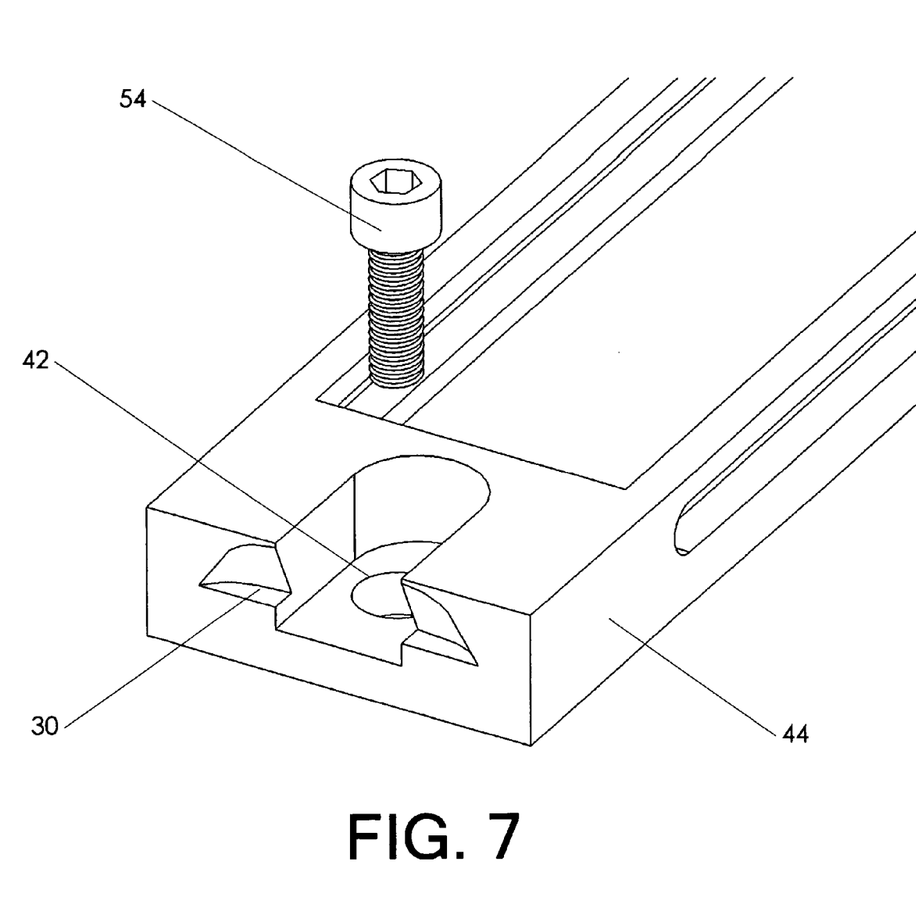
FIG. 7 is a detail view, showing the clip recess.

FIG. 7 shows a detail view of first end 44. The reader can more readily observe the shape of clip recess 30. The reader can also observe how mounting screw 54 can be passed through mounting hole 42 to attach the file holder to the reciprocating shoe on the linear sander. The mounting hole on the second end of the file holder can likewise accommodate a mounting screw.

Figure 8:
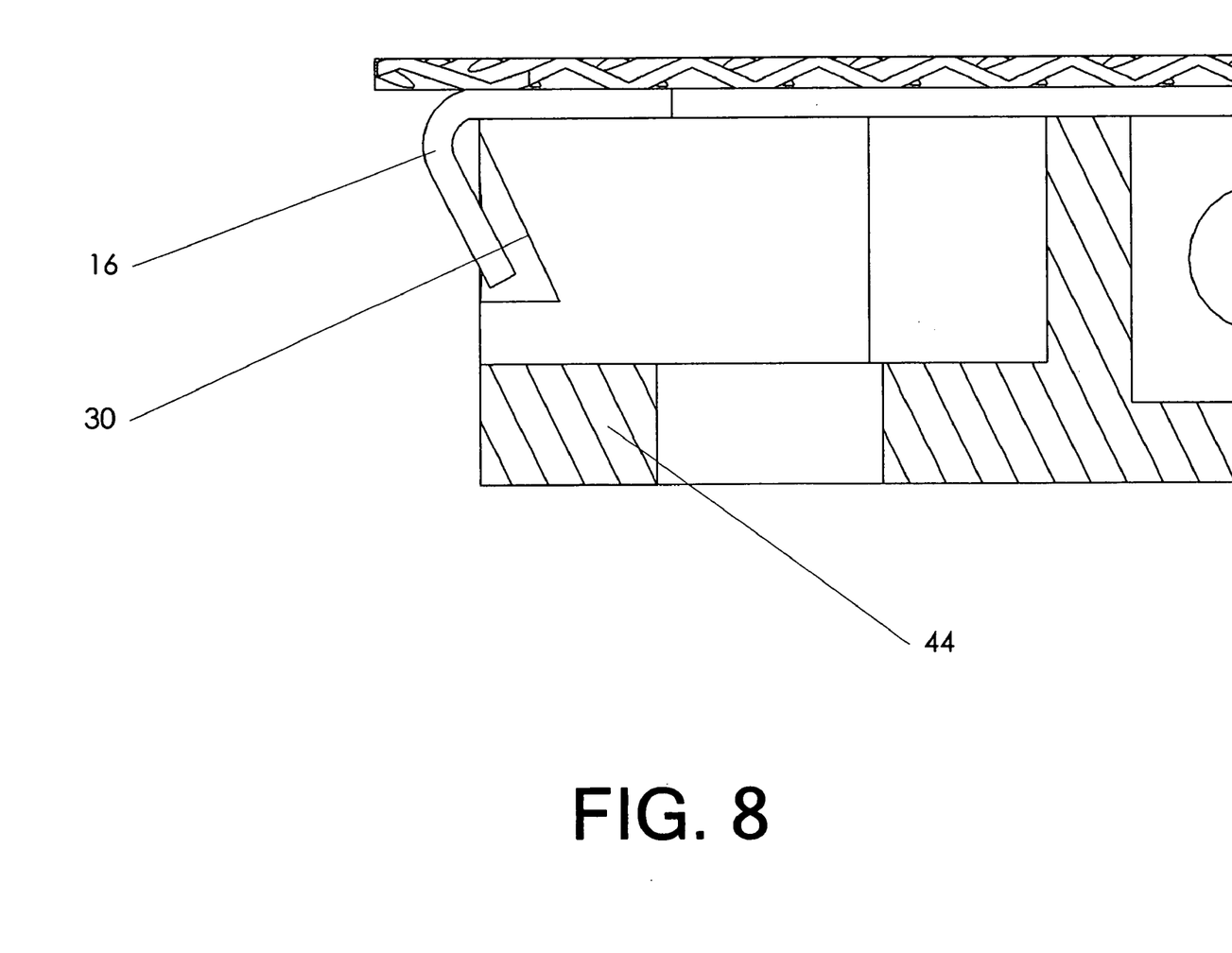
FIG. 8 is a section view, showing the clip recess.

FIG. 8 is a section view through first end 44, which allows the reader to easily observe the engagement between clip recess 30 and the canted clip 16 on the first end of the surform file (Tension has not yet been applied in the view as shown. once tension is applied, the gap between the canted clip and the clip recess will disappear).

Figure 9:
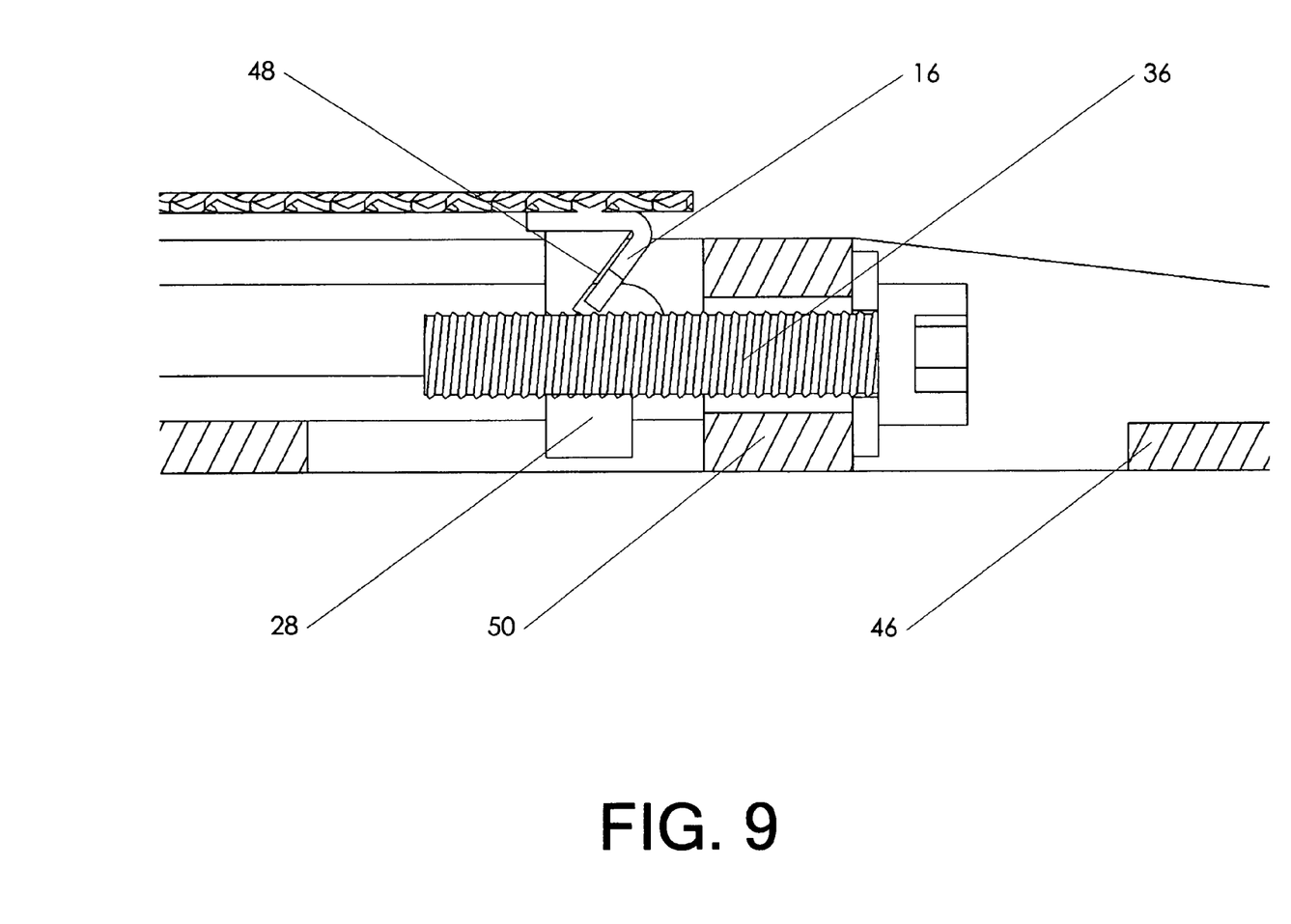
FIG. 9 is a section view, showing the tensioning block.

FIG. 9 is a section view through second end 46, which allows the reader to easily observe the engagement between clip recess 48 on tensioning block 28 and the canted clip on the second end of the surform file. The reader can also observe in this view the function of tensioning screw 36 in drawing tensioning block 28 toward bulkhead 50 (and away from clip recess 30). Thus, the reader will understand how the device secures a surform file in tension and in position for use.

The preceding description contains significant detail regarding the novel aspects of the present invention. It is should not be construed, however, as limiting the scope of the invention but rather as providing illustrations of the preferred embodiments of the invention. As an example, although a spotting scope has been used as an example of an object to be mounted using the present invention, many different objects could be mounted. Examples include video cameras, microphones, and proximity sensors. Thus, the scope of the invention should be fixed by the following claims, rather than by the examples given.

Having described my invention, I claim:

1. A file holder for attaching a surform file, wherein said surform file has a cutting face, a rear face, a first canted clip located on a first end of said surform file, and a second canted clip located on a second end of said surform file, to a linear sander, wherein said linear sander has a reciprocating shoe and a first and second mounting hole located on said reciprocating shoe, comprising:
    a. a first clip recess located on a first end of said file holder, wherein said first clip recess is shaped to engage said first canted clip on said surform file;
    b. a tensioning block, slidably located proximate a second end of said file holder, wherein said tensioning block includes a second clip recess, wherein said second clip recess is shaped to engage said second canted clip on said surform file;
    c. tensioning means for moving said tensioning block away from said first clip recess in order to place tension upon said surform file; and
    d. mounting means for attaching said file holder to said reciprocating shoe on said linear sander.

2. A file holder as recited in claim 1, wherein said mounting means comprises:
    a. a first through hole located on said file holder proximate said first end of said file holder;
    b. a second through hole located on said file holder proximate said second end of said file holder;
    c. a first threaded fastener passing through said first through hole into said first mounting hole on said reciprocating shoe; and
    d. a second threaded fastener passing through said second through hole into said second mounting hole on said reciprocating shoe.

3. A file holder as recited in claim 1, wherein said tensioning means comprises:
    a. a threaded hole passing through said tensioning block;
    b. a bulkhead, located on said file holder proximate said tensioning block, wherein said bulkhead has a clearance hole running therethrough;
    c. a tensioning screw having a threaded shaft and a head, wherein said threaded shaft lies within said clearance hole and said head bears against said bulkhead; and
    d. wherein said threaded shaft is threaded into said threaded hole in said tensioning block, so that when said tensioning screw is turned, said tensioning block moves away from said first clip recess.

4. A file holder as recited in claim 1, further comprising a chip cavity located proximate said rear face of said surform file.

5. A file holder as recited in claim 4, further comprising a plurality of ejection ports connecting said chip cavity to the exterior of said file holder.

6. A file holder as recited in claim 2, further comprising a chip cavity located proximate said rear face of said surform file.

7. A file holder as recited in claim 6, further comprising a plurality of ejection ports connecting said chip cavity to the exterior of said file holder.

8. A file holder as recited in claim 3, further comprising a chip cavity located proximate said rear face of said surform file.

9. A file holder as recited in claim 8, further comprising a plurality of ejection ports connecting said chip cavity to the exterior of said file holder.

10. A file holder as recited in claim 2, wherein said tensioning means comprises:
  a. a threaded hole passing through said tensioning block;
  b. a bulkhead, located on said file holder proximate said tensioning block, wherein said bulkhead has a clearance hole running therethrough;
  c. a tensioning screw having a threaded shaft and a head, wherein said threaded shaft lies within said clearance hole and said head bears against said bulkhead; and
  d. wherein said threaded shaft is threaded into said threaded hole in said tensioning block, so that when said tensioning screw is turned, said tensioning block moves away from said first clip recess.

11. A file holder as recited in claim 10, further comprising a chip cavity located proximate said rear face of said surform file.

12. A file holder as recited in claim 11, further comprising a plurality of ejection ports connecting said chip cavity to the exterior of said file holder.

* * * * *